US005863612A

United States Patent [19]
DeSimone

[11] Patent Number: 5,863,612
[45] Date of Patent: Jan. 26, 1999

[54] METHOD OF MAKING FLUOROPOLYMERS

[75] Inventor: Joseph M. DeSimone, Chapel Hill, N.C.

[73] Assignee: University North Carolina—Chapel Hill, Chapel Hill, N.C.

[21] Appl. No.: 797,592

[22] Filed: Feb. 7, 1997

Related U.S. Application Data

[63] Continuation-in-part of Ser. No. 529,873, Sep. 18, 1995, Pat. No. 5,739,223, which is a continuation of Ser. No. 302,642, which is a continuation of PCT/US93/01626 Feb. 26, 1993, Pat. No. 5,496,901, which is a continuation-in-part of Ser. No. 858,150, Mar. 27, 1992, abandoned.

[51] Int. Cl.⁶ .................................................. B05D 1/02
[52] U.S. Cl. ........................................ 427/422; 427/385.5
[58] Field of Search ................................. 427/422, 385.5

[56] References Cited

U.S. PATENT DOCUMENTS

| | | | |
|---|---|---|---|
| 3,294,772 | 12/1966 | Cottle | 260/93.7 |
| 3,471,463 | 10/1969 | Kaglya et al. | 260/94.9 |
| 3,522,228 | 7/1970 | Pukui et al. | 260/94.9 |
| 3,817,871 | 6/1974 | Graff | 252/312 |
| 4,243,548 | 1/1981 | Heeb et al. | 252/305 |
| 4,582,731 | 4/1986 | Smith | 427/421 |
| 4,734,227 | 3/1988 | Smith | 264/13 |
| 4,748,220 | 5/1988 | Hartmann et al. | 526/89 |
| 4,923,720 | 5/1990 | Lee et al. | 427/422 |
| 4,933,404 | 6/1990 | Beckman et al. | 526/207 |
| 5,045,220 | 9/1991 | Harris et al. | 252/8.554 |
| 5,182,342 | 1/1993 | Feiring et al. | 526/206 |
| 5,197,800 | 3/1993 | Saidman et al. | 366/136 |
| 5,211,342 | 5/1993 | Hoy et al. | 239/707 |
| 5,286,822 | 2/1994 | Krespan et al. | 526/204 |
| 5,308,648 | 5/1994 | Prince et al. | 427/212 |
| 5,310,836 | 5/1994 | Treat | 526/204 |
| 5,330,783 | 7/1994 | Saidman et al. | 427/8 |
| 5,345,013 | 9/1994 | Van Bramer et al. | 570/102 |
| 5,407,132 | 4/1995 | Moesserly et al. | 239/124 |
| 5,407,267 | 4/1995 | Davis et al. | 366/152 |
| 5,415,897 | 5/1995 | Chang et al. | 427/421 |
| 5,478,905 | 12/1995 | Analick et al. | 526/254 |

FOREIGN PATENT DOCUMENTS

| | | | |
|---|---|---|---|
| 1274942 | 10/1990 | Canada | 120/6 |
| 0 301 532 | 2/1989 | European Pat. Off. | 20/6 |
| 3537-455 | 4/1987 | Germany | 2/4 |
| 3609-829 | 9/1987 | Germany | 2/4 |
| 57-149367 | 9/1982 | Japan | 9/4 |
| 6-345824 | 12/1994 | Japan | 214/26 |
| 1172713 | 12/1969 | United Kingdom | 1/8 |
| WO93/04160 | 8/1991 | WIPO | 7/50 |

OTHER PUBLICATIONS

V. Krukonis et al., *Supercritical Fluid Chromatography Analysis of Polystyrene, Polymer Fractionation*, pp. 146–147, 156–159, 244–248–249.

E. Beckman et al., *Phase Behavior of Inverse Microemulsions for the Polymerization of Acrylamide in Near–Critical and Supercritical Continuous Phases; J. Phys. Chem*, 94 345 (1990).

S.Kumar et al., *Precipitation Polymerization in Supercritical Fluids; Rolym. Prep.*, 27, 224 (1986).

V. Sarai et al., *Free Radical Polymerization of Styrene in Supercritical Fluids; Polym. Prep*, 31, 687 (1990).

K. Scholsky, *Supercritical Polymerization Reactions; Polym. Prep* 31, 685 (1990).

G.S. Varadarajan, *Free Radical Polymerization in Super-critical Fluid Solvents* (Nov. 29, 1990), (MIT Doctoral Thesis).

DeSimone et al., *Dispersion Polymerizations in Supercritical Carbon Dioxide; Science* 265; 356–359 (1994).

DeSimone et al., *Synthesis of Fluoropolymers in Supercritical Carbon Dioxide; Science*, appeared Aug. 14, 1992.

K.A. Shaffer and J.M. DeSimone; *Chain Polymerization in Inert Near–and Supercritical Fluids TRIP* 3 No. 5; 146–153 (May 1995).

3M Letter dated Oct. 31, 1996.

Feiring et al., *Introduction to Fluorinated Polymers Parts I and II, DuPont Experimental Station and 3M Center*, 1992.

Allan T. Worm, *Introduction to Fluorocarbon Elastomers, 3M Center*, 1992.

Subhas V. Gangal, *Tetrafluorethylene Polymers, E.I. du Pont de Nemours & Co., Inc.* vol. 16, pp. 626–642, 1985.

Anestis L. Logothetis, *Fluoroelastomers, Organofluorine Chemistry: Principles and Commercial Applications*, 16, 194, pp. 373–396.

Andrew E. Feiing, *Fluoroplastics, Organofluorine Chemistry: Principles and Commercial Applications*, 15, 1994, pp. 339–372.

Gallagher–Wetmore et al., *Supercritical Fluid Processing: A New Dry Technique for Photoresist Developing, SPIE*, vol. 2438, Jun. 1995, pp. 694–708.

Mawson et al., *Formation of Poly(1,1,2,2 –tetrahydroperfluorodecyl acrylate) Submicron Fibers and Particles from Supercritical Carbon Dioxide Solutions, Macromolecules*, 1995, vol. 28, No. 9, pp. 3182–3191.

Primary Examiner—Joseph L. Schofer
Assistant Examiner—N. Sarofim
Attorney, Agent, or Firm—Myers, Bigel, Sibley & Sajovec, PA

[57] ABSTRACT

A process for making a fluoropolymer is disclosed. The process comprises solubilizing a fluoromonomer in solvent comprising a carbon dioxide fluid, and then polymerizing the fluoromonomer to produce a the fluoropolymer. A preferred solvent for carrying out the process is supercritical carbon dioxide; preferred fluoromonomers for carrying out the process are fluoroacrylate monomers such as 1,1-dihydroperfluorooctyl acrylate. The polymerization step is preferably carried out in the presence of an initiator such as azobisisobutyronitrile.

8 Claims, 1 Drawing Sheet

METHOD OF MAKING FLUOROPOLYMERS

CROSS REFERENCE TO RELATED APPLICATIONS

This application is a continuation-in-part of U.S. patent application Ser. No. 08/529,873, filed Sep. 18, 1995, U.S. Pat. No. 5,739,223 which is a continuation of U.S. patent application Ser. No. 08/302,642 filed Sep. 27, 1994, U.S. Pat. No. 5,496,901 which is a continuation under 35 U.S.C. §371 of PCT Application No. PCT/US93/01626 filed Feb. 26, 1993, which is a continuation-in-part of U.S. patent application Ser. No. 07/858,150 filed Mar. 27, 1992, abandoned.

FIELD OF THE INVENTION

The present invention relates to a method of making fluoropolymers, including copolymers thereof, in a solvent comprising a carbon dioxide fluid such as supercritical carbon dioxide.

BACKGROUND OF THE INVENTION

Chlorofluorocarbons (CFCs) have been identified as one of the main causes of the depletion of atmospheric ozone. As a result, extensive effort has been directed towards discovering alternatives to CFCs in a variety of applications. In addition to the utilization of CFCs as refrigerants and aerosols, CFCs are commonly used as solvents for the manufacture of fluoropolymers, which are generally insoluble in traditional organic solvents but can often be solubilized in CFCs. Hence, there is a need for alternative methods of manufacturing fluoropolymers.

A supercritical fluid (SCF) is a substance above its critical temperature and critical pressure (or "critical point"). Compressing a gas normally causes a phase separation and the appearance of a separate liquid phase. However, if the fluid is in a supercritical state, compression will only result in density increases: no liquid phase will be formed. The physical properties of supercritical fluids are highly unpredictable, and the use of supercritical fluids for carrying out polymerization processes has received relatively little attention.

S. Kumar et al., *Polym. Prep.* 27, 224 (1986), describe the free radical precipitation polymerization of polystyrene chains in supercritical ethane. The styrene monomers were dissolved in ethane and polymerized with azobisisobutyronitrile ("AIBN") as an initiator using an apparatus having a high-pressure optical cell.

V. Sarai and E. Kiran, *Polym. Prep.* 31, 687 (1990), describe the free radical polymerization of styrene in supercritical ethane, propane, and butane, using AIBN, t-butyl peroxide and t-butyl peroxybenzoate as initiators.

K. Scholsky, *Polym. Prep.* 31, 685 (1990), describe a variety of polymerization reactions using supercritical fluids. The article summarizes publications on the polymerization of fluorinated olefins, such as vinyl fluoride, tetrafluoroethylene, the copolymerization of tetrafluoroethylene and sulfur dioxide, and polyperfluoropropylene. Other fluorinated olefins mentioned include n-tetradecafluoroheptene-1, n-perfluoropentadiene-1,4, vinylidene chlorofluoride, and a variety of vinylic monomers. The polymerization of fluoropolymers in carbon dioxide is not suggested.

E. Beckman and R. Smith, *J. Phys. Chem.* 94, 345 (1990) describe the microemulsion polymerization of acrylamide ($CH_2CHCONH_2$) in supercritical fluids, and particularly the inverse microemulsion polymerization of water-soluble acrylamide monomers within near-critical and supercritical alkane continuous phases.

G. S. Varadarajan, *Free Radical Polymerization in Supercritical Fluid Solvents* (Nov. 29, 1990) (MIT Doctoral Thesis) describes the free radical polymerization of polymethylmethacrylate (MMA) ($CH_2=C(CH_3)COOCH_3$) in supercritical carbon dioxide using AIBN as an initiator. The polymerization of fluoromethacrylates in supercritical carbon dioxide is not suggested.

Canadian Patent No. 1,274,942 is directed to acrylic acid polymerization by homopolymerizing carboxylic acids such as acrylic acid and methacrylic in supercritical carbon dioxide. The polymerization of fluoroacrylate or fluoromethacrylate monomers in supercritical carbon dioxide is not suggested.

V. Krukonis and M. McHugh, *Supercritical Fluid Extraction*, 156–158, describes the fractionation of a perfluoroalkylpolyether oil and a chlorotrifluoroethylene oligomer in supercritical carbon dioxide, but does not suggest the polymerization of fluoromonomers in supercritical carbon dioxide.

SUMMARY OF THE INVENTION

A process for making a fluoropolymer is disclosed. The process comprises solubilizing a fluoromonomer in a solvent, the solvent comprising carbon dioxide fluid; and then polymerizing the fluoromonomer in said solvent to produce said fluoropolymer. The fluoromonomer may be a fluoroacrylate monomer, a fluorostyrene monomer, a fluorinated vinyl ether monomer, or a fluoroalkylene oxide oligomer. Fluoromonomers of the type which undergo free radical polymerization are preferred. The polymerization reaction is, in general, carried out in the presence of an initiator. The carbon dioxide fluid may be liquid carbon dioxide or supercritical carbon dioxide.

In one embodiment of the foregoing, the process may further comprise solubilizing a comonomer in the carbon dioxide fluid, with the polymerizing step comprises copolymerizing the fluoromonomer with the comonomer.

The fluoropolymers can be used as a composition for altering surface tension properties, e.g., to create low energy surfaces such as for stain resistance properties.

BRIEF DESCRIPTION OF THE DRAWINGS

In the drawings which form a part of the disclosure of the invention.

DETAILED DESCRIPTION OF THE INVENTION

Figure 1:
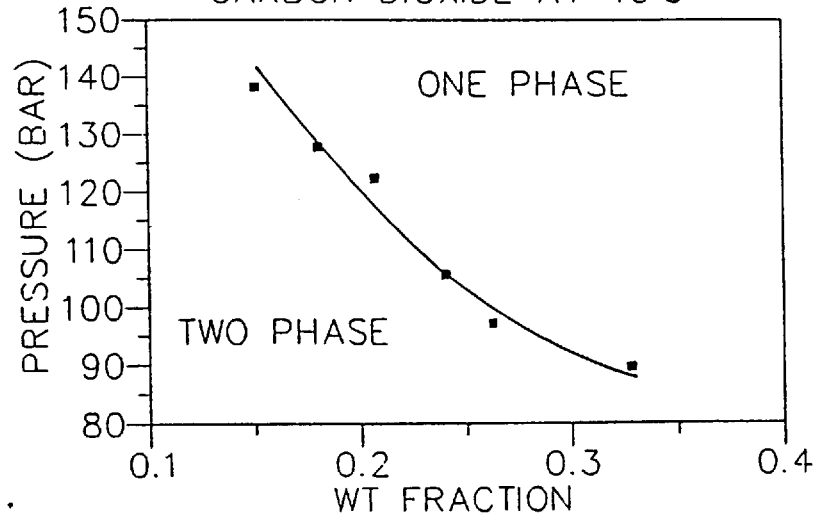
FIG. 1 is a phase equilibria diagram of poly (chlorotrifluoroethylene) in carbon dioxide at 40° C., wherein the x axis of the diagram represents the weight fraction of the sample, and the y axis represents pressure in bars.

The term "fluoropolymer," as used herein, has its conventional meaning in the art. See generally *Fluoropolymers* (L. Wall, Ed. 1972)(Wiley-Interscience Division of John Wiley & Sons); see also *Fluorine-Containing Polymers*, 7 Encyclopedia of Polymer Science and Engineering 256 (H.

Mark et al. Eds., 2d Ed. 1985). Likewise, the term "fluoromonomer" refers to fluorinated precursor monomers employed in the synthesis of fluoropolymers. The term "solubilizing," as used herein, is used to indicate that the fluoromonomers are in the same phase as the carbon dioxide fluid in the process of the present invention; hence the polymerization reactions of the present invention are solution polymerizations, as opposed to heterogeneous polymerizations or bulk polymerizations, with these terms having their ordinary meaning in the industry. See, e.g., G. Odian, *Principles of Polymerization*, 301–334 (3d Ed. 1991)(Wiley Interscience).

Any suitable fluoromonomer may be used, including, but not limited to, fluoroacrylate monomers, fluoroolefin monomers, fluorostyrene monomers, fluoroalkylene oxide monomers (e.g., perfluoropropylene oxide, perfluorocyclohexene oxide), fluorinated vinyl alkyl ether monomers, and the copolymers thereof with suitable comonomers, wherein the comonomers are fluorinated or unfluorinated. Fluoromonomers which are polymerized by a free radical polymerization process are preferred.

Fluorostyrenes and fluorinated vinyl alkyl ether monomers which may be polymerized by the method of the present invention include, but are not limited to, α-fluorostyrene; β-fluorostyrene; α,β-difluorostyrene; β,β-difluorostyrene; α,β,β-trifluorostyrene; α-trifluoromethylstyrene; 2,4,6-Tris(trifluoromethyl) styrene; 2,3,4,5,6-pentafluorostyrene; 2,3,4,5,6-pentafluoro-α-methylstyrene; and 2,3,4,5,6-pentafluoro-β-methylstyrene. These monomers are particularly useful as comonomers in the method of the present invention.

Tetrafluoroethylene copolymers which are amorphous or have low melting points can be prepared by the method of the present invention and include, but are not limited to, tetrafluoroethylene-hexafluoropropylene copolymers, tetrafluoroethylene-perfluorovinyl ether copolymers (e.g., copolymers of tetrafluoroethylene with perfluoropropyl vinyl ether), tetrafluoroethylene-ethylene copolymers, and perfluorinated ionomers (e.g., perfluorosulfonate ionomers; perfluorocarboxylate ionomers).

Fluorocarbon elastomers (see, e.g., 7 Encyclopedia of Polymer Science & Engineering 257) are a group of amorphous fluoroolefin polymers which can be produced by the process of the present invention and include, but are not limited to, poly(vinylidene fluoride-co-hexafluoropropylene); poly(vinylidene fluoride-co-hexafluoropropylene-co-tetrafluoroethylene); poly [vinylidene fluoride-co-tetrafluoroethylene-co-perfluoro (methyl vinyl ether)]; poly[tetrafluoroethylene-co-perfluoro (methyl vinyl ether)]; poly(tetrafluoroethylene-co-propylene; and poly(vinylidene fluoride-co-chlorotrifluoroethylene).

The term "fluoroacrylate monomer," as used herein, refers to esters of acrylic acid ($H_2C=CHCOOH$) or methacrylic acid ($H_2C=CCH_3COOH$), where the esterifying group is a fluorinated group such as perfluoroalkyl. A specific group of fluoroacrylate monomers useful in the method of the invention are compounds represented by formula (I):

$$H_2C=CR^1COO(CH_2)_nR^2 \qquad (I)$$

wherein:

n is 1 or 2;

$R^1$ is hydrogen or methyl; and $R^2$ is a perfluorinated aliphatic or perfluorinated aromatic group, such as a perfluorinated linear or branched, saturated or unsaturated C1 to C10 alkyl, phenyl, or naphthyl.

In a particular embodiment of the invention, $R^2$ is a C1 to C8 perfluoroalkyl or —$CH_2NR^3SO_2R^4$, wherein $R^3$ is C1–C2 alkyl and $R^4$ is C1 to C8 perfluoroalkyl.

The term "perfluorinated," as used herein, means that all or essentially all hydrogen atoms on an organic group are replaced with fluorine.

Monomers illustrative of Formula (I) above, and their abbreviations as used herein, include the following:

2-(N-ethylperfluorooctanesulfonamido) ethyl acrylate ("EtFOSEA");

2-(N-ethylperflooctanesulfonamido) ethyl methacrylate ("EtFOSEMA");

2-(N-methylperfluorooctanesulfonamido) ethyl acrylate ("MeFOSEA");

2-(N-methylperflooctanesulfonamido) ethyl methacrylate ("MeFOSEMA");

1,1-Dihydroperfluorooctyl acrylate ("FOA"); and 1,1-Dihydroperfluorooctyl methacrylate ("FOMA").

In the process of the invention, the fluoroacrylate monomers may be polymerized in the presence of a free radical polymerization initiator. Any of the various organic and inorganic initiators which are known for the polymerization of monomers can be used, so long as it is compatible with carbon dioxide. The polymerization is carried out at two different temperatures by first subjecting the monomers to initial polymerization at a lower temperature, and then completing the polymerization at a substantially higher temperature.

Organic free radical initiators are preferred and include, but are not limited to, the following: acetylcyclohexanesulfonyl peroxide; diacetyl peroxydicarbonate; dicyclohexyl peroxydicarbonate; di-2-ethylhexyl peroxydicarbonate; tert-butyl perneodecanoate; 2,2'-azobis (methoxy-2,4-dimethylvaleronitrile; tert-butyl perpivalate; dioctanoyl peroxide; dilauroyl peroxide; 2,2'-azobis(2,4-dimethylvaleronitrile); tert-butylazo-2-cyanobutane; dibenzoyl peroxide; tert-butyl per-2-ethylhexanoate; tert-butyl permaleate; 2,2-azobis(isobutyronitrile); bis(tert-butylperoxy)cyclohexane; tert-butyl peroxyisopropylcarbonate; tert-butyl peraceatate; 2,2-bis(tert-butylperoxy) butane; dicumyl peroxide; ditert-amyl peroxide; di-tert-butyl peroxide; p-menthane hydroperoxide; pinane hydroperoxide; cumene hydroperoxide; and tert-butyl hydroperoxide. Preferably, the initiator is azobisisobutyronitrile ("AIBN").

The process of the invention is carried out in a carbon dioxide fluid, e.g., carbon dioxide in a liquid or supercritical state. As will be appreciated by those skilled in the art, all gases have a critical temperature above which the gas cannot be liquified by increasing pressure, and a critical pressure or pressure which is necessary to liquify the gas at the critical temperature. For example, carbon dioxide in its supercritical state exists as a form of matter in which its liquid and gaseous states are indistinguishable from one another. For carbon dioxide, the critical temperature is about 31° C. (88° F.) and the critical pressure is about 73 atmospheres or about 1070 psi. The term "supercritical carbon dioxide" as used herein refers to carbon dioxide at a temperature greater than about 31° C. and a pressure of greater than about 1070 psi.

Liquid carbon dioxide may be obtained at temperatures of from about −15° C. to about −55° C. and pressures of from about 77 psi to about 335 psi.

One or more solvents and blends thereof may optionally be included in the carbon dioxide. Illustrative solvents include, but are not limited to, tetrahydrofuran, cyclohexane, and methanol. Such solvents are typically included in an amount, by weight, of up to about 20%.

The polymerization initiators are used in the amounts conventionally employed for polymerization. For example, the initiator may be used in an amount of about 0.01 to 10, preferably about 0.01 to 5, parts by weight per 100 parts by weight monomer.

The polymerization reaction may be carried out at a temperature of about −55° C. to about 300° C., and is typically carried out at a temperature of about −30° to 100° C. The reaction may be carried out at a pressure ranging from about 15 psi to about 45000 psi, and is typically at a pressure of from about 500 psi to about 10000 psi.

In alternative embodiments of the present invention, at least one monomer or comonomer is solubilized in carbon dioxide and copolymerized with the fluoromonomer. Any suitable monomers or comonomers can be employed, including, but not limited to, acrylate, methacrylate, acrylamide, methacrylamide, styrenics, ethylene, and vinyl ether monomers. The copolymerizations of the present invention may be carried out under temperature and pressure conditions similar to those given above.

The polymerization can be carried out batchwise or continuously with thorough mixing of the reactants in any appropriately designed high pressure reaction vessel (i.e., capable of withstanding pressures up to 45000 psi). To remove the heat evolved during the polymerization, advantageously the pressure apparatus includes a cooling system. Additional features of the pressure apparatus used in accordance with the invention include heating means such as an electric heating furnace to heat the reaction mixture to the desired temperature and mixing means, i.e., stirrers such as paddle stirrers, impeller stirrers, or multistage impulse countercurrent agitators, blades, and the like.

The polymerization can be carried out, for example, by placing the monomer and initiator in the pressure apparatus and introducing carbon dioxide in liquid form. The reaction vessel is closed and the reaction mixture brought to the polymerization temperature and pressure. Alternatively, only a part of the reaction mixture may be introduced into an autoclave and heated to the polymerization temperature and pressure, with additional reaction mixture being pumped in at a rate corresponding to the rate of polymerization. In another possible procedure, some of the monomers are initially taken into the autoclave in the total amount of carbon dioxide and the monomers or comonomers are pumped into the autoclave together with the initiator at the rate at which the polymerization proceeds.

When the polymerization is complete the reaction mixture is cooled (if necessary), the carbon dioxide separated off (e.g., by simply venting to the atmosphere), and the polymer collected. After separation of the carbon dioxide, the polymer can be collected simply by physical isolation, or by dissolution and precipitation, for example, by adding Freon-113™ or α,α,α-trifluorotoluene to the polymer to dissolve the polymer and recover it from the reaction vessel and then precipitating the same with methanol.

The solution of polymer and carbon dioxide can be separated by any method known to those in the art used to isolate polymers from solution. Examples of such methods include, but are not limited to, boiling off the carbon dioxide and leaving the polymer (e.g., fluoropolymer) behind, precipitation of the polymer into a non-solvent either by introducing a non-solvent to the reactor or the transfer of the reactor contents to another vessel containing a non-solvent for the polymer, isolation of the polymer by passing (e.g., spraying, and more particularly, spray-drying) the solution through an orifice to form particles, powders, fibers, a coating, mixtures thereof, and the like on substrates. A wide variety of substrates may be used including, but not limited to, metals, organic polymers, inorganic polymers, textiles, and composites thereof. These isolation methods have been demonstrated for conventional liquid solvent systems, as well as for solutions of polymers present in supercritical or densified gases. Often in coatings applications, polymer solutions are used as a method for delivering coatings materials to a substrate. Accordingly, the polymer and carbon dioxide do not necessarily need to be separated until used in the final application.

The following Examples are provided to further illustrate the present invention. In the Examples, SCF means supercritical fluid; AIBN means azobisisobutyronitrile; MMA means polymethyl-methacrylate; psi means pounds per square inch; g means grams; mg means milligrams; mL means milliliters; min means minutes; Mw means weight average molecular weight; Mn means number average molecular weight; MWD means molecular weight distribution (Mw/Mn); mmol means millimoles; dL/g means deciliters per gram; cm means centimeters; THF means tetrahydrofuran; DMF means N,N-dimethylformamide; DMAC means N,N-dimethylacetamide; [n] means intrinsic viscosity; NMR means nuclear magnetic resonance; GPC means gel permeation chromatography; FTIR means fourier transform infrared; IR means infrared; and temperatures are given in degrees celsius. These examples are illustrative of the invention, and should not be construed as limiting thereof.

EXAMPLES 1–17

Solubility, Polymerization and Copolymerization of Fluoroacrylate Monomers

EXAMPLE 1

Experimental Procedures

Materials. Five fluoromonomers, illustrated by Formula (II) and Table 1 and Formula (III) and Table 2, were kindly provided by Minnesota Mining and Manufacturing Company (3M). MeFOSEA, EtFOSEA and EtFOSEMA were purified by recrystallization in methanol. 1,1-Dihydroperfluorooctyl acrylate (FOA) was purified by running through $Al_2O_3$ column to remove the inhibitor. AIBN (Kodak) was recrystallized twice from methanol. Carbon dioxide (Matheson, 99.99%) was passed through copper oxide catalyst column to remove trace amounts of oxygen and then through a molecular sieve(3A) column to remove trace amounts of moisture. Freon-113 ($CF_2ClCFCl_2$) was fractionally distilled before use. Methanol (Mallinckrodt) was used as received.

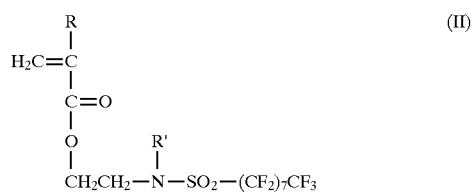

TABLE 1

Fluorinated Monomers of Formula (II)

| Name | R | R' |
|---|---|---|
| MeFOSEA | H | $CH_3$ |
| EtFOSEA | H | $CH_2CH_3$ |
| MeFOSEMA | $CH_3$ | $CH_3$ |
| EtFOSEMA | $CH_3$ | $CH_2CH_3$ |

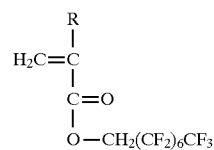

(III)

TABLE 2

Fluorinated Monomers of Formula (III)

| Name | R |
|---|---|
| FOA | H |
| FOMA | $CH_3$ |

EXAMPLE 2

Comparative Example: Polymerization in Freon 113

Before running polymerizations in supercritical carbon dioxide, a series of poly(perfluoroalkyl acrylate)s and poly (perfluoroalkyl methacrylate)s were prepared using free radical polymerization methods in Freon-113 and in α,α,α-trifluorotoluene and studied their solubility in both liquid and supercritical carbon dioxide. The fluoromonomers employed for this study are those set forth in Tables 1 and 2 above. The polymerization conditions (feed ratios of monomers, initiator and solvents), intrinsic viscosities and molecular weight data are summarized at Table 3.

A typical procedure is described below. EtFOSEA (5 g), azobisisobutyronitrile (AIBN) (10 mg) and 10 mL of Freon-113 were put into a 50 mL test tube. After sealing the tube with a rubber septum, the solution was purged with argon for ca. 15 min, placed in a water bath at 60° C. and left to polymerize for ca. 20 hours. The tube was opened next day and ca. 30 mL of Freon-113 was added to dilute the polymer solution, followed by precipitation of polymer into methanol. The polymer was filtered and dried in vacuum oven overnight. All of the monomers were polymerized in Freon-113 at 60° C. except MeFOSEA which was polymerized in α,α,α-trifluorotoluene at 70° C. due to solubility considerations.

TABLE 3

| | Feed Ratio | | | | | | |
|---|---|---|---|---|---|---|---|
| Sample | monomer (g) | AIBN (mg) | solvent (ml) | [n] | Mw | Mn | MWD |
| P(EtFOSEA) | | | | | | | |
| 910607-1 | 2 | 5 | 10 | 0.14 | 7.68e4 | 1.13e4 | 6.79 |
| 910607-2 | 2 | 10 | 10 | 0.11 | 9.23e4 | 1.32e4 | 7.02 |
| 910607-3 | 2 | 20 | 10 | 0.078 | 7.67e4 | 2.06e4 | 3.73 |
| 910614-0 | 3 | 2 + 2 | 2 | 0.44 | 1.24e5 | 5.14e4 | 2.41 |
| 910614-1 | 5 | 5 | 10 | 0.28 | 1.14e5 | 1.39e4 | 8.20 |
| 910614-2 | 5 | 10 | 10 | 0.28 | 1.56e5 | 5.56e4 | 2.80 |
| 910614-3 | 5 | 20 | 10 | 0.24 | 1.38e5 | 5.46e4 | 2.54 |
| P(EtFOSEMA) | | | | | | | |
| 910710-3 | 5 | 5 | 10 | 0.13 | 7.20e4 | 8.23e3 | 8.75 |
| P(FOA) | | | | | | | |
| 910710-1 | 5 | 5 | 10 | 0.21 | 1.10e4 | 2.90e5 | 3.78 |
| P(FOMA) | | | | | | | |
| 910710-2 | 5 | 5 | 10 | gel-like | | | |
| 910711 | 5 | 5 | 20 | 0.26* | unable to filter | | |
| P(MeFOSEA)** | | | | | | | |
| 910620-1 | 5 | 10 | 20 | 0.077 | | | |
| 910620-2 | 5 | 20 | 20 | 0.066 | | | |
| 910620-3 | 5 | 30 | 20 | 0.010 | | | |

All polymerizations are run at 60° C.
*The viscosity of the soluble part.
**Polymerized in , , trifluorotoluene.

EXAMPLE 3

Solubility Evaluation in Carbon Dioxide

The solubilities of poly(EtFOSEA) and poly(MeFOSEA) in carbon dioxide were measured using a flow system, the results of which are set forth at Table 4. Poly(EtFOSEA) was found to be very soluble in both liquid and supercritical carbon dioxide (about 25 wt. %). Poly(MeFOSEA) dissolved in liquid $CO_2$ at 3000 psi at room temperature. A view cell study discussed below verified that the polymer was also soluble in supercritical $CO_2$.

For comparison, the solubility of poly(methyl methacrylate) (PMMA) in both liquid and supercritical $CO_2$ was also studied. Quite differently, PMMA of even lower molecular weight than the two fluoropolymers discussed above is insoluble in carbon dioxide with the pressure ranging from 2000 to 5000 psi and temperature ranging from room temperature to 160° C.

To ensure that the fluoropolymers form homogeneous solutions with carbon dioxide, the solubility of the five fluoropolymers was also determined using a view cell. The results of the observations are set forth at Table 5. We observed that all the polymers dissolved and formed clear solutions in carbon dioxide at moderate pressures. Comparatively, poly(FOA) and poly(FOMA) are easier to dissolve in carbon dioxide than poly-(EtFOSEMA), poly(EtFOSEA) and poly(MeFOSEA),) but all of the polymers dissolve.

TABLE 4

Solubility study of F-polymers by flow system:

| Sample | [n] | $M_w \times 10^{-5}$ | $M_n \times 10^{-4}$ | T (°C.) | P(psi) | Solubility (wt. %) |
| --- | --- | --- | --- | --- | --- | --- |
| P(EtFOSEA) | 0.44 | 1.24 | 5.14 | 29 | 5000 | 25 |
| P(EtFOSEA) | 0.28 | 1.14 | 1.39 | 60 | 4000 | 25 |
| P(MeFOSEA) | 0.077 | — | — | 25 | 3000 | 15–20 |
| PMMA | — | 0.22 | 1.93 | 29–160 | 2000–5000 | 0 |

TABLE 5

Solubility study of F-polymers by view cell:

| Sample | [n] | $M_w \times 10^{-5}$ | $M_n \times 10^{-4}$ | T(°C.) | P(psi) | Conc. wt. % vol |
| --- | --- | --- | --- | --- | --- | --- |
| P(EtFOSEA) | 0.44 | 1.24 | 5.14 | 25 | 7000 | 9 |
| P(EtFOSEA) | 0.24 | 1.38 | 5.46 | 25 | 3000 | 5 |
| P(MeFOSEA) | 0.077 | — | — | 60 | 3700 | 5 |
| P(FOA) | 0.21 | 11.0 | 29.0 | 25 | 2000 | 5 |
| P(FOA) | 0.21 | 11.0 | 29.0 | 25 | 3000 | 10 |
| P(FOMA) | 0.26 | — | — | 25 | 2000 | 5 |
| P(EtFOSEMA) | 0.13 | 0.72 | 0.82 | 25 | 4000 | 5 |

*Pressure at which the polymer totally dissolve.

EXAMPLE 4

Polymerization of 1,1-dihydroperfluorooctyl Acrylate (FOA) in Carbon Dioxide FOA (5.0 g, 11.0 mmol, purified by running through $Al_2O_3$ column) and AIBN (50 mg, 0.30 mmol, recrystallized twice from methanol) were put into a 10 mL high pressure reaction cell with a micromagnetic stir bar inside. The reaction cell was purged with argon for ca. 10 minutes and then filled with carbon dioxide to a pressure of less than 1000 psi. Over a period of one hour, the cell was heated to 60° C. and the pressure was increased to 3000 psi by the addition of more $CO_2$. The polymerization was continued at these conditions for 48 hours, during which the system was homogeneous and clear.

At the end of the polymerization, carbon dioxide was vented slowly to leave the polymer in the cell. The polymer was dissolved with Freon-113 and was precipitated into a large excess of methanol. The polymer was isolated by suction filtration, washed several times with methanol, and dried in vacuo overnight to give 3.25 g of transparent viscous polymer (yield: 65%).

Characterizations: $^1H$ NMR spectrum showed the expected pattern, without vinyl proton peaks of the monomer and without any indication of incorporation of carbon dioxide onto the polymer backbone. The intrinsic viscosity was measured to be 0.19 dL/g in Freon-113 at 30° C. The FTIR spectrum was consistent with the corresponding homopolymer made in Freon-113, with only one carbonyl peak at 1758 $cm^{-1}$.

EXAMPLE 5

Polymerization of FOA in carbon dioxide

FOA (2.0 g, 4.4 mmol) and AIBN (30 mg, 0.18 mmol) were put into the high pressure cell. Following the same procedure as described in Example 4, polymerization was proceeded at 3000 psi and 60° C. for 24 hours, and 0.41 g of polymer was obtained (yield: 21%).

Characterizations: $^1H$ NMR and FTIR spectra were consistent with those of the homopolymer made in Freon-113.

EXAMPLE 6

Polymerization of 1,1-dihydroperfluorooctyl Methacrylate (FOMA) in Carbon Dioxide FOMA (3.0 g, 6.41 imol, purified by running through $Al_2O_3$ column) and AIBN (30 mg, 0.18 mmol) were put into the 10 mL high pressure reaction cell. The reaction cell was purged with argon for ca. 10 minutes then filled with carbon dioxide to a pressure of less than 1000 psi. Over a period of one hour, the cell was heated to 60° C., and the pressure was increased to 4000 psi by the addition of more $CO_2$. The polymerization was continued at these conditions for 48 hours, during which the system was homogeneous and clear. At the end of the polymerization, carbon dioxide was vented slowly to leave the polymer in the cell. The polymer was dissolved with Freon-113 and was precipitated into a large excess of methanol. The polymer was isolated by suction filtration, washed several times with methanol, and dried in vacuo overnight to give 2.19 g of a white powder (yield: 73%).

Characterizations: $^1H$ NMR and FTIR spectra were consistent with those of the same polymer made in Freon-113. The intrinsic viscosity was measured to be 0.06 dL/g in Freon-113 at 30° C.

EXAMPLE 7

Polymerization of FOMA in $CO_2$

FOMA (5.0 g, 10.7 mmol) and AIBN (50 mg, 0.3 mmol) was put into the 10 mL high pressure cell. Following the same procedure described in Example 4, the polymerization was carried out in $CO_2$ at 60° C. and 5000 psi for 48 hours.

During the entire course of the polymerization, the solution was homogeneous and clear. The polymer was isolated according to the same procedure as described above.

Characterizations: $^1$H NMR and FTIR spectra were consistent with those of the same polymer made in Freon-113. The intrinsic viscosity was measured to be 0.06 dL/g in Freon-113 at 30° C.

EXAMPLE 8

Polymerization of 2-(N-methylpgrfluorooctane-sulfonamido) ethyl Acrylate (MeFOSEA) in Carbon Dioxide MeFOSEA (5.0 g, 8.75 mmol, purified by recrystallization from methanol) and AIBN (50 mg, 0.30 mmol) were put into the 10 mL high pressure reaction cell. The reaction cell was purged with argon for ca. 10 minutes then filled with carbon dioxide to a pressure of less than 1000 psi. Over a period of one hour the cell was heated to 60° C. and the pressure was increased to 5000 psi by the addition of more $CO_2$. The polymerization was continued at these conditions for 48 hours, during which the system was homogeneous and clear. At the end of the polymerization, carbon dioxide was vented slowly to leave the polymer in the cell. The polymer was dissolved in $\alpha,\alpha,\alpha$-trifluorotoluene and was precipitated into a large excess of methanol. The polymer was isolated by suction filtration, washed several times with methanol, and dried in vacuo overnight to give 3.2 g of white powder (yield: 64%).

Characterizations: FTIR spectra were consistent with those of the same polymer made in Freon-113.

EXAMPLE 9

Polymerization of MeFOSEA in Carbon Dioxide

MeFOSEA (1.0 g, 1.75 mmol) and AIBN (10 mg, 0.06 mmol) were put into the high pressure cell. Following the same procedure of Example 4, the polymerization was proceeded under 4000 psi and 60° C. for 8 hours, and 0.19 g of polymer was obtained (yield: 19%).

Characterizations: FTIR spectrum were consistent with the same polymer made in Freon-113. The intrinsic viscosity was measured to be 0.064 in $\alpha,\alpha,\alpha$-trifluorotoluene at 70° C.

EXAMPLE 10

Polymerization of 2-(N-ethylprfluorooctane-sulfonamido) Ethyl Acrylate (EtFOSEA) in Carbon Dioxide EtFOSEA (5.0 g, 8.53 mmol, purified by recrystallization from methanol) and AIBN (50 mg, 0.30 mmol) were put into the 10 mL high pressure view cell. The reaction cell was purged with argon for ca. 10 minutes then filled with carbon dioxide to a pressure of less than 1000 psi. Over a period of one hour the cell was heated to 60° C. and the pressure was increased to 5000 psi by the addition of more $CO_2$. The polymerization was continued at these conditions for 48 hours, during which the system was homogeneous and clear. At the end of the polymerization, carbon dioxide was vented slowly to leave the polymer in the cell. The polymer was dissolved in Freon-113 and was precipitated into a large excess of methanol. The polymer was isolated by suction filtration, washed several times with methanol, and dried in vacuo overnight to give 3.9 g of a white powder (yield: 78%).

Characterizations: $^1$H NMR and FTIR spectra were consistent with those of the same polymer made in Freon-113.

The intrinsic viscosity was measured to be 0.20 dL/g in Freon-113 at 30° C. Both the polymers made in $CO_2$ and in Freon-113 were purified by dissolving in Freon-113 and reprecipitating into methanol and an elemental analysis by ORS was performed. The results are summarized in Table 6 below.

TABLE 6

Elemental Analysis of Poly(EtFOSEA) Made in Carbon Dioxide and in Freon-113

| Sample | % C | % H | % N | % F | % S |
|---|---|---|---|---|---|
| P-Freon | 28.69 | 1.86 | 2.21 | 51.47 | 5.05 |
| P—$CO_2$ | 28.80 | 1.91 | 2.24 | 50.78 | 4.81 |
| Calculated | 29.01 | 2.01 | 2.33 | 50.64 | 5.34 |

EXAMPLE 11

Polymerization of 2-(N-ethylprfluorooctane-sulfonamido) Ethyl Methacrylate (EtFOSEMA) in $CO_2$ EtFOSEMA (5.0 g, 8.33 mmol, purified by recrystallization from methanol) and AIBN (50 mg, 0.30 mmol) were put into the same reaction vessel. The reaction vessel was purged with argon for ca. 10 minutes then filled with carbon dioxide to a pressure of less than 1000 psi. Over a period of one hour the cell was heated to 60° C., and the pressure was increased to 5000 psi by the addition of more $CO_2$. The polymerization was continued at these conditions for 48 hours, during which the system was homogeneous and clear. At the end of the polymerization, carbon dioxide was vented slowly to leave the polymer in the vessel. The polymer was dissolved in Freon-113 and was precipitated into a large excess of methanol. The polymer was isolated by suction filtration, washed several times with methanol, and dried in vacuo overnight to give 3.2 g of white powder.

Characterizations: $^1$H NMR and FTIR spectra were consistent with those of the same polymer made in Freon-113. The intrinsic viscosity was measured to be 0.10 dL/g in Freon-113 at 30° C.

EXAMPLE 12

Copolymerization of FOA with Methyl Methacrylate (MMA) in $CO_2$

FOA (4.0 g, mmol, purified by running through $Al_2O_3$ column), MMA (1.0 g, 10.0 mmol, purified by vacuum distillation over $CaH_2$) and AIBN (50 mg, 0.30 mmol) were put into the 10 mL high pressure view cell. The reaction cell was purged with argon for ca. 10 minutes then filled with carbon dioxide to less than 1000 psi. Over a period of one hour the cell was heated to 60° C. and the pressure was increased to 5000 psi by the addition of more $CO_2$. The polymerization was continued at these conditions for 48 hours, during which the system was homogeneous and clear. At the end of the polymerization, carbon dioxide was vented slowly to leave the polymer in the cell. The polymer was dissolved in Freon-113 and was precipitated into a large excess of methanol. The polymer was isolated by suction filtration, washed several times with methanol, and dried in vacuo overnight to give 3.25 g of copolymer (yield: 65%). The copolymer was extracted with THF three times to remove any possible PMMA homopolymer.

Characterizations: Solubility of the copolymer in normal solvents and Freon-113 was checked and the results are summarized in Table 7 below.

TABLE 7

Solubility Test of PFOA-co-PMMA-1

| Solvent | solubility |
| --- | --- |
| Freon-113 | soluble, but slightly cloudy |
| acetone | liquified but insoluble |
| THF | liquified but insoluble |
| $CH_2Cl_2$ | swelled |
| toluene | swelled |
| DMF | slightly swelled |
| DMAc | slightly swelled |

$^1$H NMR and FTIR spectra were indicative of a statistical or random copolymer. Composition of the copolymer was calculated to be 58 mol % FOA from the $^1$H NMR spectrum. IR spectrum showed two carbonyl peaks at 1758 (carbonyl of FOA segments) and 1734 cm$^{-1}$ (carbonyl of MMA segments), respectively. The intrinsic viscosity was measured to be 0.10 dL/g in Freon-113 at 30° C.

EXAMPLE 13

Copolymerization of FOA and MMA in Carbon Dioxide

FOA (3.0 g, 6.6 mmol, purified by running through $Al_2O_3$ column), MMA (2.0 g, 20.0 mmol, purified by vacuum distillation over $CaH_2$) and AIBN (50 mg, 0.30 mmol) were put into the high pressure cell. The reaction cell was purged with argon for ca. 10 minutes then filled with carbon dioxide to less than 1000 psi. Over a period of one hour the cell was heated to 60° C. and the pressure was increased to 5000 psi by the addition of more $CO_2$. The polymerization system became nonhomogeneous after ca. 12 hours. After 48 hours, there existed two layers, with the bottom layer accounting for ca. ¼ of the total reactor volume and a cloudy upper layer accounting for ca. ¾ of the total volume. At the end of the polymerization, carbon dioxide was vented slowly to leave the polymer in the cell. The polymer was dissolved in Freon-113 and was precipitated into a large excess of methanol. The polymer was isolated by suction filtration, washed several times with methanol, and dried in vacuo overnight to give 3.3 g of copolymer (yield: 66%). The copolymer was extracted with DMF three times.

Characterizations: $^1$H NMR and FTIR spectra show the expected patterns. Composition of copolymer was calculated from proton NMR spectrum to be 27 mol % in FOA. Two carbonyl peaks appear on the IR spectrum (1758 and 1734 cm$^{-1}$). The intrinsic viscosity was measured to be 0.12 dL/g in acetone at 30° C. The solubilities of the copolymer in normal solvents are 6. summarized in Table a below.

TABLE 8

Solubility of PFOA-co-PMMA-2 in Different Solvents

| Solvent | Solubility |
| --- | --- |
| Freon-113 | soluble |
| acetone | soluble |
| THF | soluble |
| $CHCl_3$ | soluble |
| $CH_2Cl_2$ | soluble (40° C.) |
| toluene | soluble (100° C.) |

TABLE 8-continued

Solubility of PFOA-co-PMMA-2 in Different Solvents

| Solvent | Solubility |
| --- | --- |
| DMF | insoluble |
| DMAc | insoluble |

Since this copolymer is soluble in normal solvents, $^{13}$C NMR and $^{19}$F NMR spectra was measured in d6-acetone. Only two carbonyl peaks appeared on the spectrum (177, 178 ppm). The $^{19}$F NMR spectrum showed six resonances. GPC was run with THF as solvent and polystyrene as standard. The results were Mn=5.10×10$^4$, Mw=7.45×10$^4$, MWD=1.46.

EXAMPLE 14

Copolymerization of FOA and MMA in $CO_2$ with THF as a Co-Solvent

FOA (3.0 g, 6.6 mmol), MMA (2.0 g, 20 mmol) and AIBN (50 mg, 0.30 mmol) were put into the high pressure cell. 1.0 mL (10 vol %) THF was added into the mixture. The reaction cell was purged with argon for ca. 10 minutes and then filled with carbon dioxide to less than 1000 psi. Over a period of one hour the cell was heated to 60° C., and the pressure was increased to 5000 psi by the addition of more $CO_2$. The polymerization was continued at these conditions for 48 hours. The system was homogeneous for at least 30 hours at which time it became cloudy. The solution remained homogenous for a longer time than the polymerization reaction conducted without the cosolvent (Example 13). At the end of the polymerization, carbon dioxide was vented slowly to leave the polymer in the cell. The polymer was dissolved in Freon-113 and was precipitated into a large excess of methanol. The polymer was isolated by suction filtration, washed several times with methanol, and dried in vacuo overnight to give 3.9 g of white polymer (yield: 78%).

Characterizations: GPC was run with THF as solvent. The results were: Mn=5.50×10$^4$, MW=8.23×10$^4$, MWD=1.50.

EXAMPLE 15

Copolymerization of FOA and n-butyl Acrylate (BA) in Carbon Dioxide

FOA (4.0 g, 6.6 mmol), BA (1.0 g, 7.8 mmol, purified by running through $Al_2O_3$ column) and AIBN (50 mg, 0.30 mmol) were put into the high pressure reaction cell. The reaction cell was purged with argon for ca. 10 minutes then filled with carbon dioxide to less than 1000 psi. Over a period of one hour the cell was heated to 60° C. and the pressure was increased to 5000 psi by the addition of more $CO_2$. The polymerization was continued at these conditions for 48 hours, during which the system was homogeneous and clear. At the end of the polymerization, carbon dioxide was vented slowly to leave the polymer in the cell. The polymer was dissolved with Freon-113 and was precipitated into a large excess of methanol. The polymer was isolated by suction filtration, washed several times with methanol, and dried in vacuo overnight to give a transparent elastic material which was purified by extracting with acetone overnight.

Characterizations: $^1$H NMR and FTIR spectra were indicative of a random or statistical copolymer. Composition of the copolymer was calculated to be 59% FOA based on $^1$H NMR. Two carbonyl resonances appeared in the IR spectrum (1760 and 1720 cm$^{-1}$). The intrinsic viscosity was 0.45 dL/g in Freon-113 at 30° C. The solubility of the copolymer is summarized in Table 9.

TABLE 9

The Solubility of PFOA-co-PBA in Different Solvents

| Solvent | Solubility |
|---|---|
| Freon-113 | soluble |
| acetone | insoluble |
| THF | insoluble |
| CHCl$_3$ | dispersed but insoluble |
| toluene | insoluble |
| DMF | insoluble |

EXAMPLE 16

Copolymerization of FOA with Styrene in $CO_2$

FOA (4.0 g, 6.6 mmol), styrene (1.0 g, 9.6 mmol, purified by vacuum distillation) and AIBN (50 mg, 0.30 mmol) were put into the high pressure reaction cell. The reaction cell was purged with argon for ca. 10 minutes then filled with carbon dioxide to less than 1000 psi. Over a period of one hour the cell was heated to 60° C. and the pressure was increased to 5000 psi by the addition of more $CO_2$. The polymerization was continued at these conditions for 48 hours, during which the system was homogeneous and clear. At the end of the polymerization, carbon dioxide was vented slowly to leave the polymer in the cell. The polymer was dissolved with Freon-113 and was precipitated into a large excess of methanol. The polymer was isolated by suction filtration, washed several times with methanol, and dried in vacuo overnight to give a very tacky material. The polymer was extracted with acetone overnight to remove any possible styrene homopolymer.

Characterizations: $^1$H NMR and FTIR spectra were indicative of a random or statistical copolymer. All the peaks of FOA were shifted upfield by ca. 0.4 ppm. Also the peak of the methylene proton adjacent to the perfluoroalkyl chain was broadened. IR spectrum showed one carbonyl resonance at 1758 cm$^{-1}$ and peaks appeared in the region between 3000 to 3100 cm$^{-1}$ due to the stretching vibration of C—H on the phenyl ring of the styrene repeating unit.

EXAMPLE 17

Copolymerization of FOA with Ethylene in $CO_2$

FOA (4.0 g, 6.6 mmol) and AIBN (50 mg, 0.30 mmol) were put into the high pressure cell. Ethylene (0.46 g, 16.4 mmol) was transferred from a small bomb into the reaction cell. $CO_2$ was added, and the temperature was raised to 60° C. and the total pressure was 5000 psi. The polymerization was allowed to proceed for ca. 48 hours. During this time period, the system remained homogeneous and clear. After venting $CO_2$, the product was dissolved with Freon-113 and precipitated into large excess of methanol to give 2.9 g of viscous polymer (yield: 65%). The copolymer was extracted with boiling toluene for two hours to remove any polyethylene homopolymer.

Characterization: The copolymer was insoluble in acetone, toluene, THF, chloroform and DMF. It was soluble in Freon-113. $^1$H NMR spectrum showed a new peak appearing at ca. 1.5 ppm, which is presumably due to the protons of the ethylene repeat unit. FTIR show similar pattern to PFOA homopolymer. The resonance of ethylene repeat unit may be buried by the resonance of the backbone of FOA. Intrinsic viscosity was measured to be 0.14 dL/g in Freon-113 at 30° C.

EXAMPLE 18

Cationic Polymerization of Vinyl Ethers in $CO_2$

Vinyl ethers with a fluoroalkyl group according to Formula (IV):

$$R^1R^2C=CR^3O(CH_2)_nR \qquad (IV)$$

wherein:

n is 0, 1, or 2;

$R^1$, $R^2$, and $R^3$ are each independently hydrogen or fluorine; and

R is perfluorinated aliphatic or perfluorinated aromatic group, for example, $CH_2=CH-OCH_2CH_2N(n-C_3H_7)SO_2C_8F_{17}$ or $CH_2=CH-OCH_2C_8F_{17}$, are polymerized with an initiator such as boron trifluoroetherate, hydrogen iodine/iodine, and hydrogen iodine/zinc iodine in liquid and supercritical carbon dioxide using the procedure of Example 4 above. It has previously been known that these monomers could be solvent polymerized in Freon. See W. Choi et al., Polymer J. 20, 201 (1988). Thus, this example indicates that the ability of a monomer to undergo solution polymerization in Freon-113 is a good indicator that the monomer can be polymerized in liquid or supercritical carbon dioxide.

EXAMPLE 19

Polymerization of 1,1-Disubstituted Monomers 1,1-disubstituted monomers according to Formula (V):

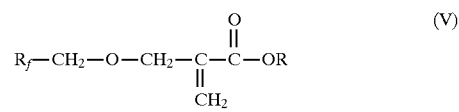

wherein R is C1–C4 alkyl (e.g., ethyl) and $R_f$ is $(CF_2)_nF$ wherein n is 1–10, (e.g., $CF_3$, $(CF_2)_2F$, $(CF_2)_7F$, or $(CF_2)_{10}F$), are polymerized in liquid or supercritical carbon dioxide under conditions using the procedure of Example 4 above.

EXAMPLE 20

Polymerization with Chain Transfer Agents

Functional fluoropolymers are produced in liquid or supercritical carbon dioxide by polymerizing a fluoromonomer such as FOA in carbon dioxide in the presence of a chain transfer agent such as substituted allylic sulfides. This results in fluoropolymers capped with a carboxy, hydroxy, trialkylsilyl, or amino groups.

EXAMPLE 21

Polymerization of Block Fluoropolymers

Block fluoropolymers are produced in liquid or supercritical carbon dioxide using the procedure of Example 4 above, using pseudo-living free radical polymerization routes. For example, FOA is polymerized in carbon dioxide with nitroxides similar to that disclosed in U.S. Pat. No. 4,581,429 or with oxygen-centered radical species generated from hyponitrite, arenediazoate, or cyanate anions by reaction with electron acceptors such as arenediazonium ions or activated alkyl halides with sequential monomer additions, similar to Druliner, J. D., *Macromolecules* 1991, 24, 6079.

EXAMPLE 22

Poly(perfluoroalkyl ether) Polymerization

Poly(perfluoroalkyl ether)s are made in liquid or supercritical carbon dioxide using the procedure of Example 4 above. For example, perfluoropropylene oxide is polymerized using initiators derived from alkali metal fluorides and an acid fluoride such as $CF_3CO$—F in carbon dioxide to yield viscous oils.

EXAMPLE 23

Preparation of Monomers

Styrene (Aldrich), methyl methacrylate (MMA) (Aldrich), acrylic acid (AA) (Aldrich) were purified by running through an alumina column and deoxygenated before polymerization. N-Octyl acrylate (OA), octadecyl methacrylate (ODMA) and all the perfluoroalkyl acrylates described above in Example 1 were purified in a similar fashion. Vinylidene fluoride ($VF_2$) (Aldrich, 99+%) and pentafluorostyrene (5FSt) (PCR Inc.) were used as received. The styrene-based monomer carrying a fluorocarbon segment, p-perfluoroalkylethyleneoxymethyl styrene (STF), was prepared by a phase-transfer-catalyzed etherification of fluorocarbon-substituted alcohol with p-(chloromethyl) styrene:

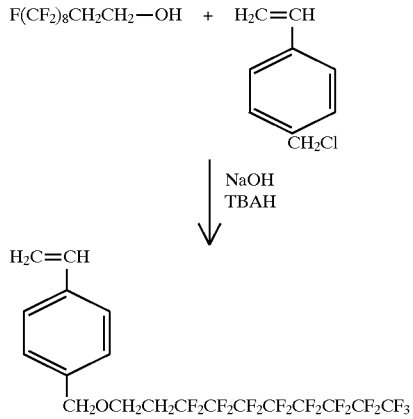

EXAMPLE 24

Homopolymerization of Fluorostyrene Monomer p-perfluoroalkylethyleneoxymethyl Styrene (STF)

A typical example of a homopolymerization in supercritical $CO_2$ was conducted as follows. STF (1.0 g, 1.72 mmol) and AIBN (30 mg, recrystallized twice from methanol) were put into a 10-mL high pressure view cell containing a micromagnetic stir bar. The reaction cell was purged with argon for ca. 10 minutes, and then filled with $CO_2$ to less than 68 bar. The cell was heated to 60° C. and the pressure was increased to 345 bar by the addition of more $CO_2$. The polymerization was continued at these conditions for 3 days, during which time the system remained homogeneous and optically transparent. At the end of the polymerization, the cell was cooled to room temperature and $CO_2$ was vented resulting in the precipitation of the polymer. The unreacted monomer was extracted with dichloromethane. The polymer was dried to constant weight and characterized (65% yield).

The other monomers ($VF_2$, 5FSt, styrene, MMA, AA) were all homopolymerized in supercritical carbon dioxide according to a procedure similar to that above; however, these polymers precipitated during the course of the reaction in $CO_2$ under the conditions described.

EXAMPLE 25

Homopolymerization of Fluorostyrene Monomer

Fluorostyrene monomers according to Formula (VI):

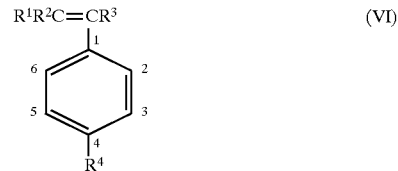

wherein:

$R^1$ and $R^2$ are each independently hydrogen, fluorine, or methyl;

$R^3$ is hydrogen, fluorine, methyl or perfluoromethyl;

$R^4$ is hydrogen, fluorine, or C1–C12 perfluorinated aliphatic group; and the 2, 3, 5, and 6 positions of the aromatic styrene ring are each independently hydrogen or fluorine, are polymerized with an initiator such as AIBN in liquid and supercritical carbon dioxide using the concentrations and procedure of Example 24 above.

EXAMPLE 26

Copolymerization of Fluorinated Monomer (Fluoroacrylate MeFOSEA) with Non-Fluorinated Comonomer (OA)

A copolymerization of the fluorinated monomers with non-fluorinated monomers in supercritical $CO_2$ was conducted as follows. 2-(N-Methylperfluorooctanesulfonamido) ethyl acrylate (MeFOSEA, 1.3 g, 2.12 mmol), OA (0.70 g, 3.80 mmol) and AIBN (30 mg, 0.18 mmol) were put into the 10-mL high pressure view cell. Following the procedure as described above in Example 24, the copolymerization was continued at 60° C. and 345 bar for 24 hours. The system was homogeneous during the entire course of the polymerization. After venting the $CO_2$, the copolymer was redissolved in Freon-113 and precipitated into large excess of methanol. The polymer was filtered and washed with methanol several times and dried in vacuo overnight to give 1.35 g of copolymer (68% yield).

The other non-fluorinated monomers are also copolymerized in a similar fashion.

EXAMPLE 27

Copolymerization of Fluorinated Monomer (Fluoroacrylate FOA) With Fluorinated Comonomer (Vinylidene Fluoride)

The 10-mL high pressure cell was loaded with 1,1-dihydroperfluorooctyl acrylate (FOA, 3.0 g, 6.6 mmol) and AIBN (50 mg, 0.30 mmol). After purging with argon thoroughly, the cell was connected to a $VF_2$ cylinder, 3.02 of $VF_2$ (47.2 mol) was transferred into the cell by cooling down the cell in a dry ice/isopropanol bath. After warming the cell to room temperature, carbon dioxide was filled to ca. 68 bar. The heating of the cell was continued and more $CO_2$ was added until the cell reached 60° C. and 345 bar. The polymerization was continued at these conditions for ca. 50 hours during which the system was homogeneous during the entire course of the reaction. The copolymer was obtained according to the same work-up procedure.

EXAMPLE 28

Polymerization of 1,1-difluoroethylene ($VF_2$)

A low molecular weight polymer or oligomer was made in carbon dioxide by polymerizing 1,1-difluoroethylene ($VF_2$) in the presence of a perfluoroalkyliodide. 1.0 g of $C_4F_9I$ and 2.0 g of $VF_2$ was transferred into a 10-mL stainless steel cell fitted with sapphire windows. The cell was heated to 36° C. and filled to 3000 psi with carbon dioxide. The reaction was homogeneous (optically transparent and colorless). The cell was irradiated with an ultraviolet lamp for 24 hours, during which time the reaction remained homogeneous and turned color from colorless to light purple or pink.

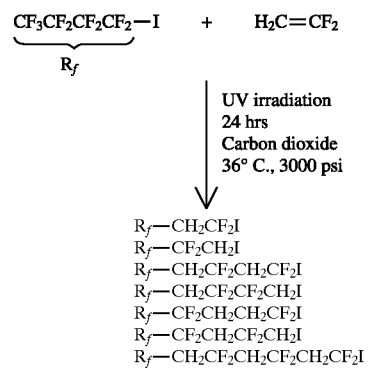

The product distribution was determined by gas chromatography-mass spectrometry to include the various products listed above with the various regioisomers as shown.

EXAMPLE 29

A low molecular weight polymer or oligomer is made in carbon dioxide by polymerizing tetrafluoroethylene (TFE) using the concentrations and procedures of Example 28 above, but in the presence of a chain transfer agent such as trifluoromethyl iodide or IF to yield:

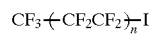

or

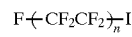

under homogeneous conditions in a stainless steel or Hastalloy reactor/view cell.

EXAMPLE 30

Following the procedure set forth in Example 28 and 29 above, fluoroolefins, such as tetrafluoroethylene (TFE), chlorotrifluoroethylene (CTFE), hexafluoropropylene (HFP), perfluoro-2,2-dimethyl-1,3-dioxole or mixtures of these monomers, or with the addition of ethylene monomer, are polymerized under homogeneous conditions in carbon dioxide.

EXAMPLE 31

Low molecular weight polymers or oligomers are made in carbon dioxide using a process essentially as described in Examples 28, 29 and 30 above, but the reaction product is endcapped with ethylene to yield:

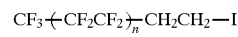

or

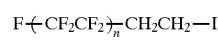

EXAMPLE 32

A dimer, oligomer or low molecular weight polymer of CTFE, HFP, TFE, or $VF_2$ is obtained by following the procedures of Example 28 above, except that the fluoroolefin or mixtures of the fluoroolefins are treated with $I_2$ or another Lewis acid (such as $FeCl_3$) in carbon dioxide to form a product soluble in carbon dioxide. Halogenated chain transfer agents or telogens such as $Cl_3CBr$, $CFCl_3$, $CFCl_3$, $CCl_4$, Br—$CFCl$—$CF_2$—Br are optionally added. The reactions are optionally facilitated by UV irradiation or added peroxide.

EXAMPLE 33

Terpolymerization of Fluoroolefin Monomers

A fluoropolymer is made by terpolymerizing TFE, CTFE, and ethylene in carbon dioxide using a peroxide initiator and a chain transfer agent such as freon-li and the following ratios of TFE/CTFE/Ethylene:20/45/35; 10/55/35; and 30/30/40.

EXAMPLE 34

Polymerization of Fluoroolefin TFE

An oligomer or low molecular weight polymer of TFE is made in carbon dioxide by treating TFE with a nucleophile in carbon dioxide oxide to form a carbon dioxide-soluble product, such as trimer, tetramer, pentamer and hexamer.

 (3)

 (4)

 (5)

-continued

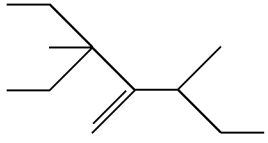

(6)

EXAMPLE 35

Polymerization of Fluoroolefin HFP

An oligomer or low molecular weight polymer of hexafluoropropylene (HFP) is obtained by treating HFP with a nucleophile such as CsF in carbon dioxide to form a soluble product in carbon dioxide.

EXAMPLE 36

Polymerization of Fluorostyrene Monomer STF Using a Palladium Catalyst

A polymer is made in carbon dioxide under the homogeneous conditions by copolymerizing a fluorinated monomer, such as:

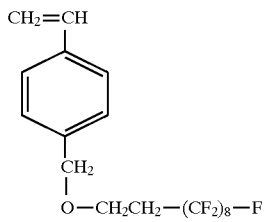

with carbon monoxide using a palladium catalyst (for concentrations, see, e.g., M. Brookhart et al., J. Am. Chem. Soc. 114, pg. 5894 (1992)) to yield:

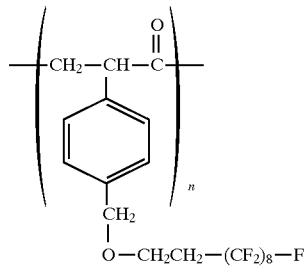

EXAMPLE 37

Polymerization Using a Cosolvent

A polymerization is carried out in essentially the same manner as described above, except that a cosolvent is added to carbon dioxide, such as less than about 5% by weight diglyme, to form a product soluble in carbon dioxide.

EXAMPLE 38

Isolation of Polymer

A process is carried out in essentially the same manner as described in Examples 23–37 above, except that the product is isolated either all at once by continuous reduction of pressure (venting) or is isolated in fractions by controlled release or step-wise reduction of pressure and subsequent collection and separation of the product.

EXAMPLE 39

Solubility of Fluoroolefin Polymer TFE

A low molecular weight polymer or oligomer of tetrafluoroethylene (TFE) with the structure:

where n=1–5, was completely dissolved in carbon dioxide at 5000 psi and 60° C.

EXAMPLE 40

Solubility of Endcapped Fluoroolefin Polymer TFE

A low molecular weight polymer or oligomer of TFE which was endcapped with ethylene, having the structure:

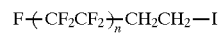

where n=1–5, was dissolved in carbon dioxide at 2000 psi and 60° C.

EXAMPLE 41

Solubility of Fluoroolefin Polymer CTFE

A low molecular weight polymer or oligomer of chlorotrifluoroethylene (CTFE) with the structure:

was dissolved in carbon dioxide over a wide range of pressures and weight fractions. The phase diagram at 40° C. as shown in FIG. 1 was determined.

EXAMPLE 42

Solubility of Fluoroacrylate Polymer FOA

Figure 2:
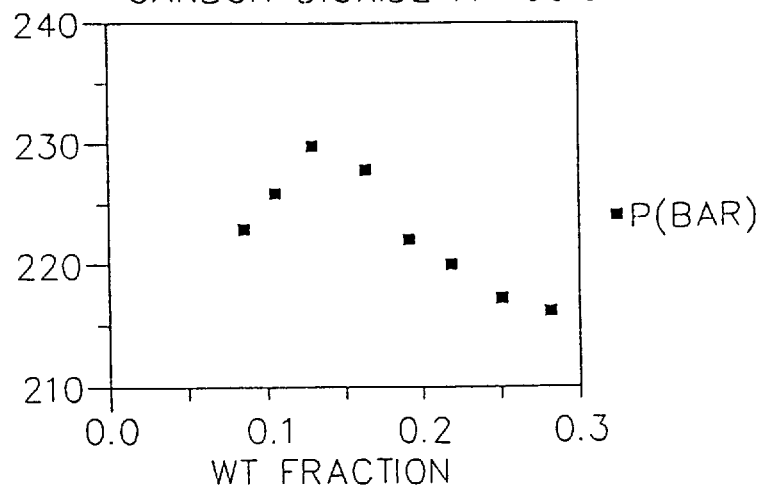
FIG. 2 is a phase equilibria diagram of poly(1,1-dihydroperfluorooctyl acrylate) in carbon dioxide at 60° C., wherein the x axis of the diagram represents the weight fraction of the sample, and the y axis represents pressure in bars.

A high molecular weight polymer of (1,1-dihydroperfluorooctyl) acrylate with the structure:

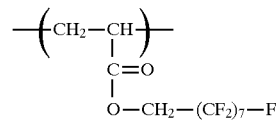

was dissolved in carbon dioxide over a wide range of pressures and weight fractions. The phase diagram at 60° C. as shown in FIG. 2 was determined.

EXAMPLE 43

Solubility of Fluoroalkylene Oxide Polymer

A low molecular weight polymer or oligomer of hexafluoropropylene oxide (Krytox) with the structure:

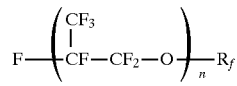

was dissolved in carbon dioxide at 5000 psi and 60° C.

EXAMPLE 44

Solubility of Fluorostyrene Polymer

A high molecular weight polymer of a fluoroalky substituted styrene monomer with the structure:

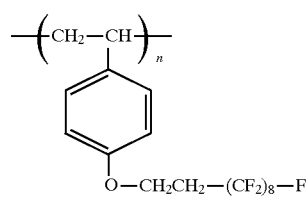

was dissolved in carbon dioxide at 5000 psi and 60° C.

EXAMPLE 45

Solubility of Fluoroacrylate Polymer MeFOSEA

A high molecular weight polymer with the structure:

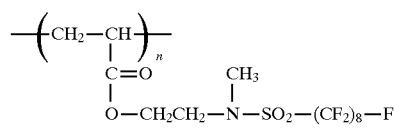

was dissolved in carbon dioxide at 5000 psi and 60° C.

EXAMPLE 46

Solubility of Fluoroolefin-Teflon Copolymer

A high molecular weight statistical copolymer of TFE and perfluoro-2,2-dimethyl-1,3-dioxole (Teflon AF 1600) having the following structure:

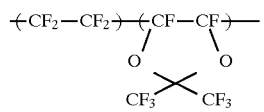

was heated to 80° C. and pressurized to 6000 psi with carbon dioxide. At these conditions two liquid phases formed—a polymer rich phase and a carbon dioxide rich phase. Upon venting, the carbon dioxide-rich phase turned cloudy indicating that some of the polymer dissolved in carbon dioxide.

EXAMPLE 47

Solubility of Fluorinated Vinyl Ether Polymer

A high molecular weight polymer with the structure:

was dissolved in carbon dioxide at 3490 psi at 60° C. The polymer also dissolves in freon-113, but is insoluble in common organic solvents such as THF, dichloromethane, and chloroform.

The foregoing examples are illustrative of the present invention, and are not to be taken as restrictive thereof. The invention is defined by the following claims, with equivalents of the claims to be included therein.

That which is claimed is:

1. A method of applying a polymer to a substrate, said method comprising:

providing a homogeneous solution comprising carbon dioxide and a fluoropolymer; and spraying said homogeneous solution onto a substrate such that said carbon dioxide separates from said fluoropolymer and wherein said polymer coats said substrate.

2. The method according to claim 1, wherein said carbon dioxide is supercritical carbon dioxide.

3. The method according to claim 1, wherein said carbon dioxide is liquid carbon dioxide.

4. The method according to claim 1, wherein said substrate is selected from the group consisting of metals, organic polymers, inorganic polymers, textiles, and composites thereof.

5. The method according to claim 1, wherein said polymer is a fluoropolymer selected from the group consisting of fluoroacrylate polymers, fluoroalkylene oxide polymers, fluorostyrene polymers, fluorinated vinyl ether polymers, fluoroolefin polymers, and mixtures thereof.

6. The method according to claim 1, wherein said step of spraying said solution comprises spraying said solution through an orifice.

7. The method according to claim 1, wherein said polymer is present on said substrate in a configuration selected from the group consisting essentially of particles, powders, coatings, and mixtures thereof.

8. The method according to claim 1, wherein said spraying step is carried out by spray-drying said solution onto said substrate.

* * * * *